J. REECE.
VARIABLE SPEED TRANSMISSION.
APPLICATION FILED MAR. 11, 1920.

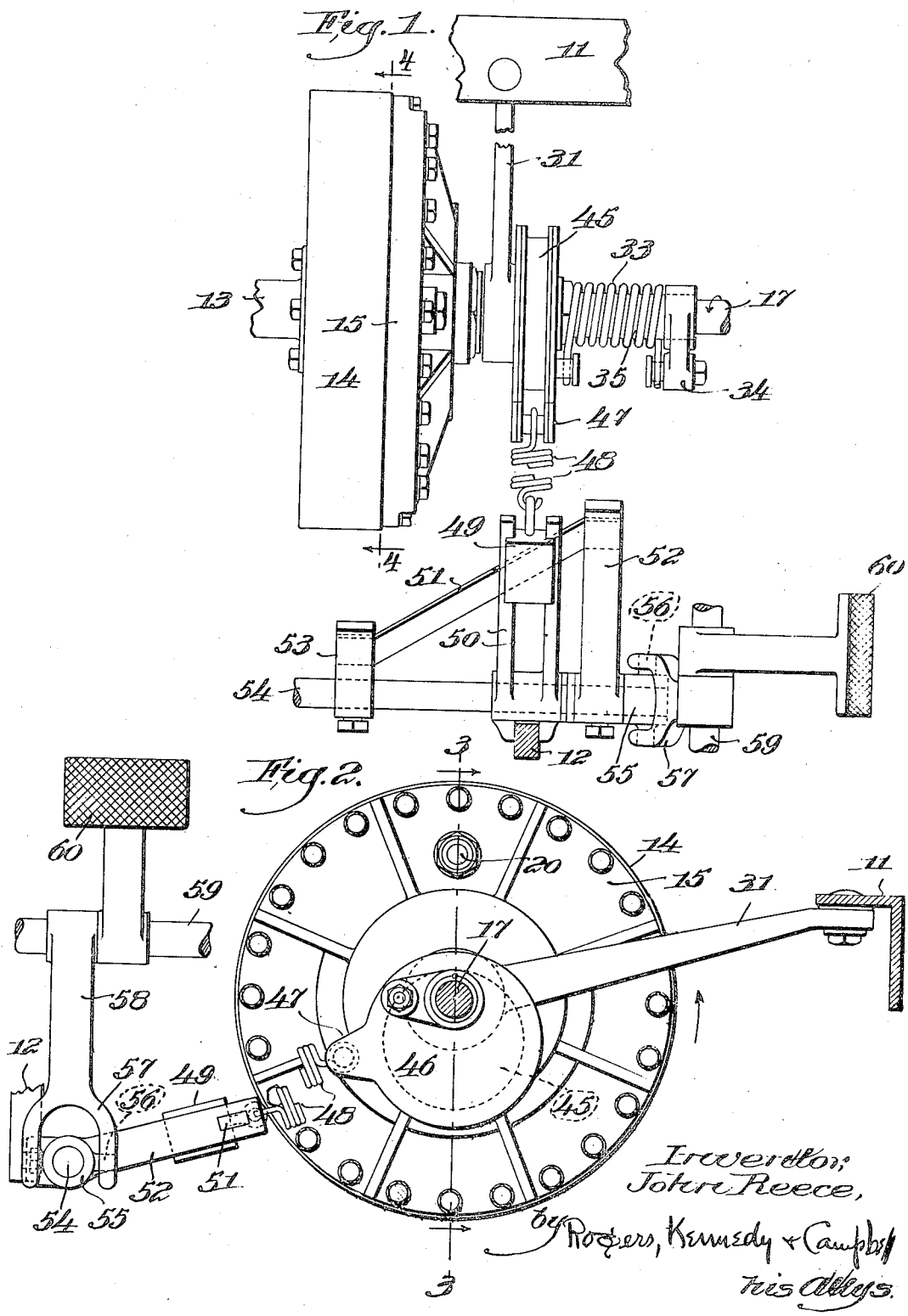

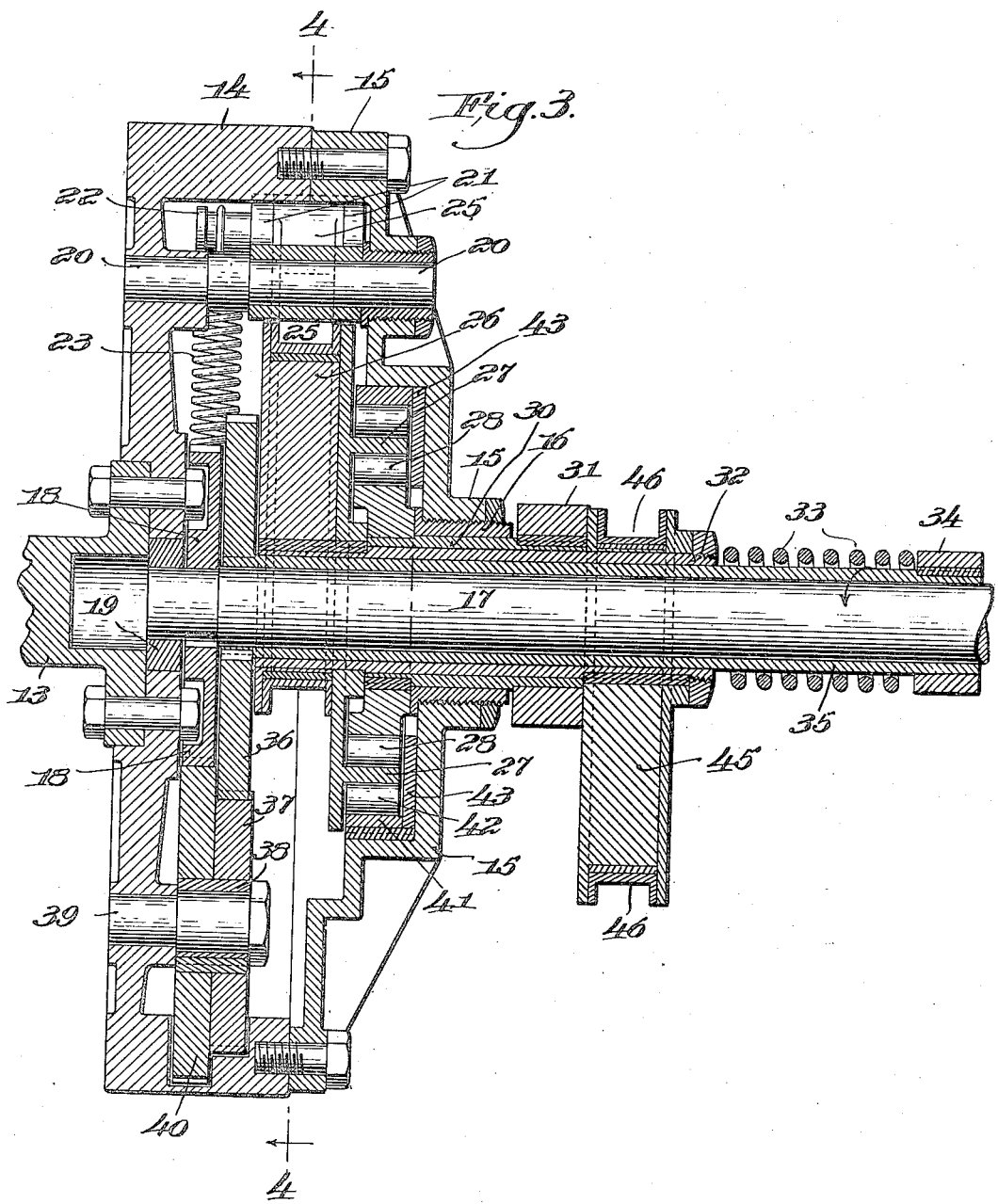

1,428,659.

Patented Sept. 12, 1922.
4 SHEETS—SHEET 3.

Inventor:
John Reece
by Rogers, Kennedy & Campbell
his Attys

J. REECE.
VARIABLE SPEED TRANSMISSION.
APPLICATION FILED MAR. 11, 1920.
1,428,659.
Patented Sept. 12, 1922.
4 SHEETS—SHEET 4.
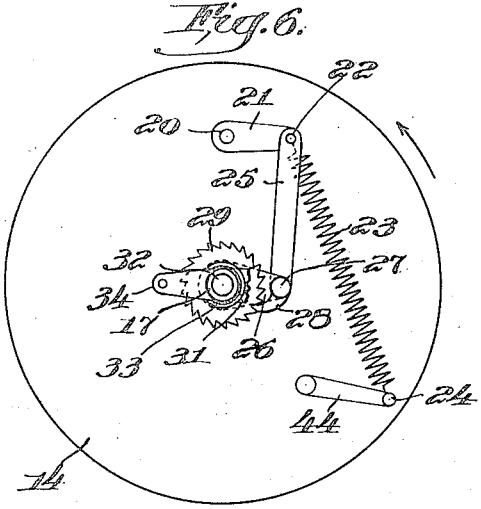
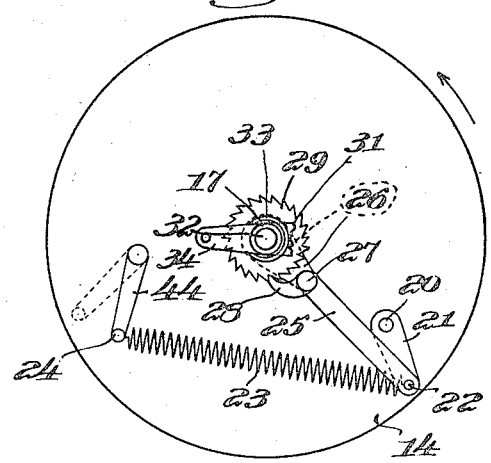
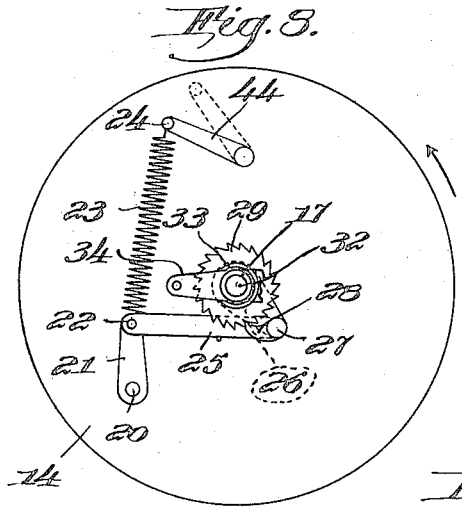
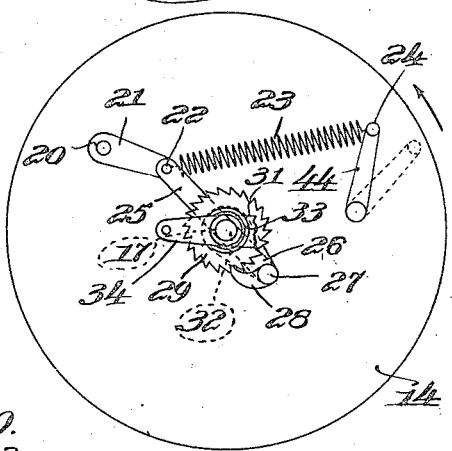
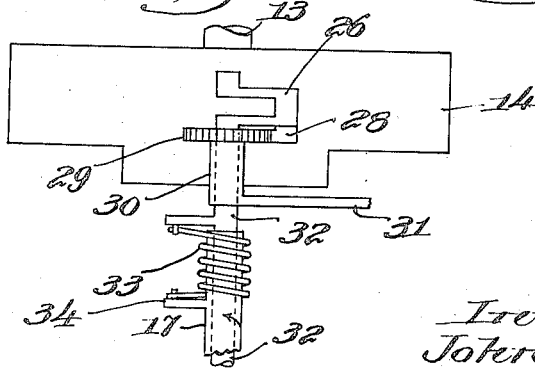
Inventor,
John Reece,
by Rogers, Kennedy & Campbell,
his Attys Patented Sept. 12, 1922.

1,428,659

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

VARIABLE-SPEED TRANSMISSION.

Application filed March 11, 1920. Serial No. 364,895.

*To all whom it may concern:*

Be it known that I, JOHN REECE, a citizen of the United States, residing at Boston, in the county of Suffolk and State of Massachusetts, have invented certain new and useful Improvements in Variable-Speed Transmission, of which the following is a specification, reference being had therein to the accompanying drawing.
This invention is a novel variable speed transmission adapted to use in various situations and for various purposes, for example, as a part of the power transmission mechanism of motor vehicles.
The general object is to improve variable speed transmissions as heretofore known, and more especially by affording a mechanism by which the speed ratio between the engine and the driven parts may be regulated to any desired point between the maximum and minimum. Other objects are to afford a mechanism in which, when running at full or normal speed, there will be required no internal motion or change of relation of the parts; also to give quietness and smoothness of action; to avoid the transmission from the engine to the driven parts of vibratory action in the engine; and to afford a simple and effective means of reversing the drive.
Other objects and advantages of the invention will be made clear in the hereinafter following description of one form or embodiment hereof, or will be obvious to those skilled in the art.
To the attainment of the objects and advantages mentioned, the present invention consists in the novel variable speed transmission and the novel features of combination, arrangement, mechanism, design and detail herein described or claimed.

Preliminarily it may be stated that my invention involves, in addition to the driving member, operated for example, at uniform speed by the engine, and the eventual driven member or shaft, an intermediate rotatable member which is connected in the manner to be described with both the driving and driven members. Associated with the intermediate rotating member or between it and the driven shaft I introduce an elastic or spring connection, which is capable of acting as a reservoir of energy such that a certain amount of irregularity or intermittency of motion or action in the intermediate member is permitted without materially affecting the steadiness of rotation of the driven shaft, but maintaining a substantially uniform force or torque thereupon. I also provide a certain elastic connection between the driving member and the intermediate member. This is a device of such nature and so arranged with relation to the driving and intermediate members that at one part of the rotation or cycle of action the driving member, operating through the elastic device, and accompanied by increase of stress therein, urges forward the intermediate member, whereas at another period or stage of the action, and while the intermediate member is substantially stationary or anchored, the elastic member, reasserting itself, applies its energy to a forward impulse on the driving member. In combination with these described elements, I employ a means for varying at will the action or effect of the elastic connection operating between the driving and intermediate members, in such way as to enable the advance of the intermediate member, or rather its average rate of advance, which is irregular, to be increased or diminished at will. When the ratio is unity, all parts, including the intermediate member, rotate uniformly as a unit and without reciprocation or relative change of position. As will be seen, I have additionally provided certain connections to permit reverse drive, these being in the nature of toothed gears brought into operation at a point intermediate the driven shaft and the elastic connection through which the latter is driven.

In the accompanying drawings, Fig. 1 is a top plan view indicating portions of a motor vehicle and a transmission mechanism embodying the principles of the present invention.

Fig. 2 is a right elevation of the parts shown in Fig. 1.

Fig. 3 is a section taken on the section line 3—3 of Fig. 2.

Figure 4:
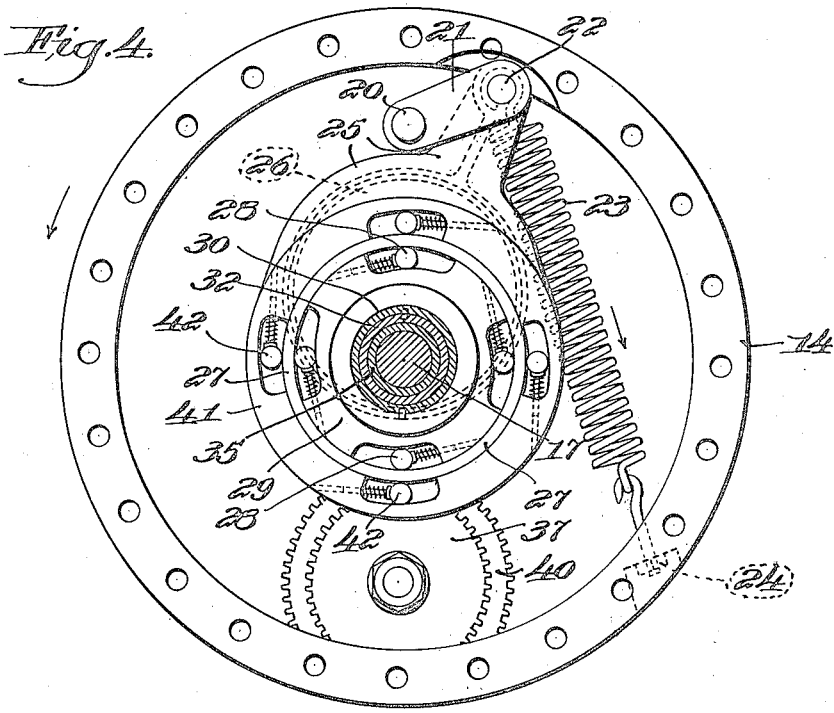

Fig. 4 is a right elevation partly in section on the section line 4—4 of Figs. 1 and 3, with the cover plate 15 removed to show the interior parts.

Figure 5:
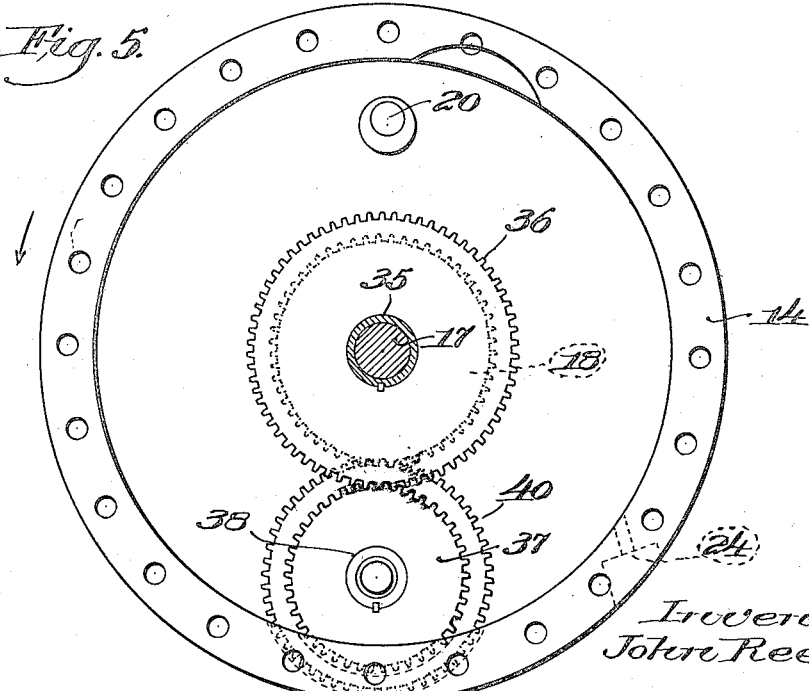

Fig. 5 is a similar interior view in right elevation, with certain other parts removed to show those at the extreme left.

Figs. 6, 7, 8 and 9 are in the nature of diagrams taken in right elevation, illustrating in successive positions the principles of the present invention; and Fig. 10 is in the nature of a plan view of certain of the parts of the diagram Fig. 6.

Referring first to Fig. 1, there is shown a horizontal frame part 11 of the motor vehicle, and at the opposite side a vertical frame part 12. The engine shaft 13 is provided with the usual form of flywheel 14, which, however, is hollow and contains mechanism pertaining to this invention, and is provided with a removable cover plate 15. The hub portion of the cover plate, as seen in Fig. 3, is provided with a bearing sleeve 16, engaging the sleeve 30 within the same, afterwards to be described. These parts 13 to 16 rotate together and may be considered the driving member of the mechanism.

The driven member is shown in the form of a shaft 17, which is arranged in alignment with the engine shaft, although this is not always essential. Fast on the forward end of the driven shaft is a gear 18, through which, as will be explained, the power is actually communicated to the shaft. A bearing ring 19 is shown between the left end of the driven shaft and the driving member.

Before explaining the connections between the driving and driven members, as shown in Figs. 1 to 5, it will facilitate description to refer first to the diagrams Figs. 6 to 9, in which the driving and driven members 14 and 17 are indicated.

The elastic connection between the driving member and the intermediate member 26 to be described may take various forms. Instead of a simple spring arranged radially or otherwise, I prefer the following mechanism or its equivalent. A pin or stud 20 is mounted near the rim of the driving member or flywheel, and this carries a swinging arm 21, which at its free extremity is provided with a pin 22. To this pin 22 is attached one end of the elastic device or spring 23, the other end of which is anchored or secured at 24 at a convenient point on the driving member. The spring 23 is of considerable strength so as to be able to transmit substantial power to the intermediate and driven parts, and it is of sufficient length such that its play in expanding and contracting will not too greatly alter its pulling power. The effect of the spring on the arm 21, it will be seen, is to tend constantly to swing the free end of the arm 21 toward the axis of the machine. A connector 25, shown in the diagrams as having the form of a rod, extends to a crank or eccentric 26, which also is rotatable about the same axis as the driving and driven members. The member 26 is shown in the diagrams as a crank, but in the main figures as a true eccentric. The normal direction of rotation of the parts seen in Figs. 2 and 4 to 9 is counterclockwise, as is usual on motor vehicles, and when the intermediate member or crank 26 is rotated, it turns in such direction. For reasons to be explained, it is essential that the member 26 be prevented from rotating in a reverse direction when driving forwardly. To ensure this I provide a part or pin 27 at the periphery of the crank, and a pawl 28 between this and a stationary ratchet wheel 29. The intermediate member or crank 26 is shown mounted on a shaft or rod 32, which is in axial alignment with the driven shaft 17. The driven shaft in the diagram is shown as a sleeve surrounding 32. As before stated, however, these two are not rigidly connected, but on the contrary an elastic connection or coil spring 33 is provided, its terminals connected respectively to the shaft 32 and the driven member, so as to resiliently communicate motion from one to the other.

It will be understood, when the apparatus is running under normal conditions, that the elastic element or spring reservoir 33 is under stress. It may be under stress to the extent of several rotations as between the members 26 and 17, the latter being the driven member offering resistance to rotation, and the former applying rotative force or torque to the spring to maintain this condition. According to variations in the delivery of the power or in the load, the spring 33 will assert itself or yield so as to maintain practically uniform drive of the driven member.

Coming now to the driving and intermediate members 14 and 26 and the communication of power from one to the other, these parts and the elastic connection between them may during uniform drive at unit ratio assume substantially the position shown in Fig. 6. The flywheel or disk 14 rotating counterclockwise operates through the arm 21 and connector 25 to advance the crank 26 in the same direction. The spring 23 is of sufficiently great strength to normally avoid yielding and thus hold the parts in the illustrated normal position. Everything will rotate together in substantially the relation shown. It is obvious that this operation depends on the operation and effect of the spring 23. If its operation be eliminated in any manner, the driving effect will be totally removed. In such case the crank 26 might remain just where shown, and the arm 21 and connector 25 simply go through their motions, as they are carried round and round with the rotation of the driving disk. I have found that by varying the action or pull of the spring 23 between its aforesaid maximum and zero, I am enabled to secure at will various degrees of torque, and therefore speeds of drive of the crank 26. In the diagrams I have indicated a device 44 as a conventional means of varying the pull of the spring 23. This is supposed to be swung so that its outer or free end will cause the relaxing or tightening of the spring. In Fig. 6 the spring is supposed to be shown at its full tension, and the parts rotating at unity ratio. In Figs. 7, 8 and 9 I have assumed the device 44 to be shifted to partly relax on the spring 23, so as to give a reduced ratio of drive or torque, for example two to one, for the purpose of explaining the relative motion of the parts 21, 23 and 25, as the driving member turning at full speed causes the rotation of the crank 26 at reduced speed. The general principle of operation at less than unit ratio is to introduce or permit loss of motion or rotation in the crank more or less often in accordance with the speed reduction, but without any appreciable loss of power or efficiency, and with provision, namely, the elastic elements, for ensuring substantial uniformity of torque and rotation delivered to the driven member. The tighter the spring 23, or the more effective its action, the more rigid will be the rotation of the crank 26, and the less frequent its loss of rotation.

As seen in Fig. 7, the spring 23 has yielded, owing to the excess resistance offered by the crank and the elements beyond it. This yield has continued to the point where the crank and the connector 25 are in alignment, that is, on dead center. When in this position the driver is effecting no drive of the crank, but is advancing without resistance therefrom. This is one of the critical points in the operation of the mechanism. Whenever the parts pass this dead center position, the intermediate member or crank 26 drops or loses half a rotation relatively to the driving member. With a two to one ratio the crank would thus lose a half rotation once on every rotation of the driver. As the parts pass forward from the Fig. 7 position, it will be noticed that the pull of the spring 23 is directed to forwarding the driving member, thus throwing back into the driving system the energy, which thus is not wasted, but is stored up for the succeeding driving action. The purpose of the pawl and ratchet device 28, 29 will now be evident. Without these the tendency of the spring 23, after the parts pass the Fig. 7 position, would be to thrust backward the crank 26. This in turn would permit the spring 33, which is provided between the crank and the driven shaft, to assert itself and relax, and the maintained condition of tension and balance in the operation would be wholly destroyed. The pawl and ratchet permits the advancing of the crank 26, but always precludes any reverse rotation. The crank, it will be understood, is the instrument through which the driving parts act to transmit energy, which is stored up in the subsequent spring 33 as a reservoir. The crank 26 may advance irregularly or intermittently, but the average rate of advance will be such as to impart torsion to the spring 33 to maintain the latter in the desired condition of torsion or tension as the power is drawn from the latter by the driven shaft.

After the parts have passed considerably beyond the Fig. 7 position, they will come to a position such as indicated in Fig. 8. During this time the crank 26 has been stationary, and the driven shaft has received its power solely from the energy stored in spring 23. This condition still exists in the Fig. 8 position, and will continue thereafter until the parts pass the next or opposite dead center shown in Fig. 9. Beyond this point the spring 23 will cease its action tending to force the crank reversely, and will on the contrary operate to thrust the crank forwardly. The crank advances and stops intermittently, while the connections between the driving disk and the crank operate for approximately one rotation, that is, a half rotation relatively to the crank's motion, to advance the crank, followed by a similar period without effective action, the spring 23 slightly yielding and reasserting itself during the action, without loss of power.

Reverting to the main Figures 1 to 5, on which we have already described the driving and driven members, we will now describe the elements or mechanisms corresponding to those shown on the diagrams Figs. 6 to 9. The flywheel, which is one of the driving members, may be termed a disk, and secured near the periphery of this is a pin 20 corresponding to the pin 20 of the diagrams. Swinging about the pin 20 is the arm 21, at the free end of which is a pin 22, pulled by the strong elastic member or spring 23, anchored at 24. Connected to the free end of the arm 21 by means of the pin 22 is the eccentric strap or rod 25, surrounding the eccentric 26. The eccentric, it is understood, is essentially the equivalent of a crank such as the crank 26 of the diagram. Rigid with the eccentric 26 is a part 27, shown in the form of a ring, between which and a stationary ratchet wheel 29 are a series of pawls 28. These, unlike the pawls shown in the diagrams, are in the form of friction pawls or rollers, operating in tapered recesses between the parts 27 and 29, and acted upon by springs in a well known manner to permit rotation in one direction and prevent it in the other direction, without noise or irregularity of action. In order to hold the ratchet wheel 29 stationary, this is seen in Fig. 3 to be keyed to a sleeve 30, which extends rearwardly beyond the flywheel cover plate to an exterior point where it has secured to it an arm 31, extending laterally and attached to a frame part 11, thus preventing swinging and rotation of these parts.

The crank or eccentric 26 is keyed to a sleeve 32, which also extends to the right to an exterior point, at the extremity of which is provided a nut to hold the parts in position. It will be understood that the eccentric 26 and the sleeve 32 just mentioned are rigidly connected, and in fact constitute the intermediate member of the present invention. A suitable elastic connection between the intermediate member just described and the driven shaft is shown in the form of a helical spring 33, suitably connected to the sleeve 32 and extending and connected to an arm 34, the hub of which is keyed to a sleeve 35, which directly surrounds the driven shaft 17 and extends forwardly almost to the forward end of the shaft. The coil spring 33 loosely surrounds the sleeve 35, so that when it is placed under tension, it is capable of affording several turns without the contraction of the spring bringing it into contact with the sleeve, which latter forms a sort of stop for the tensioning of the spring and prevents its passing the breaking point.

The left end of the sleeve 35 is shown provided with a gear 36, which in turn engages a pinion 37, keyed to a sleeve 38, mounted on a stud 39, attached to the driving member or disk 14. A second pinion 40, also keyed to the sleeve 38, and therefore rotating with the pinion 37, engages the gear 18, which has already been mentioned, keyed directly on the driven shaft 17. Normally there is no relative motion or rotation as between the gears 36, 37, 40 and 18, that is, during unit ratio of drive, but at reduced ratios these gears operate somewhat as a planetary gear, serving to modify the driven speed; and, as will be explained, they come into useful action for the purpose of reverse drive when desired.

Under certain conditions the intermediate member, eccentric or crank 26 of this invention might tend to rotate faster than the driving members with certain disadvantages, and in order to prevent this, I provide the following mechanism. Mounted on the driving disk is shown a ratchet wheel 41, co-operating with the same pawl ring 27 before described, and between the parts 41 and 27 are shown pawls 42 similar to the pawls 28. These, however, are reversed in direction of operation, and therefore prevent the eccentric 26 from rotating faster than the driving parts. A washer 43 is shown, located between the pawl ring and a portion of the cover plate to minimize wear.

I will next describe a means to reduce or offset the action of the spring 23 forming part of the elastic connection between the driving and the intermediate members of this invention. In the diagrams I conventionally show an arm 44 for relaxing on the spring, but in practice this would give certain disadvantages. It would be mechanically difficult or impractical to readjust the tension of the spring 23 during the high speed of rotation of the parts. I, therefore, prefer to reduce or offset the action of the spring by means of another spring, located at a different point in the mechanism, I show this accomplished in such way that the second or offset spring is non-rotating and is, therefore, readily adjustable in its tension. Its tension can be decreased to practically zero, so that the spring 23 will have maximum effect, or can be increased to reduce the effect of spring 23 at will. To these purposes I provide at the exterior end of the sleeve 32 an eccentric 45, keyed to the sleeve, so that the two eccentrics 26 and 45 with the sleeve rotate in unison practically as a rigid member. The strap 46 surrounding the eccentric 45 is provided with an extension 47, engaged by a spring 48, which is arranged to pull forcibly and radially outward. The effect of this spring pulling constantly on the eccentric strap is to resist the rotation of the eccentric for a half turn, and during the balance of each rotation to expedite or assist its rotation. In other words it operates substantially oppositely to the spring 23 before mentioned, tending to more or less balance and offset the action of the later, depending on the degree of tension in the spring 48.

In order to regulate the tension of the spring 48, and thereby, as described, vary the action of the spring 23 and the ratio of transmission between the driving and driven elements, I provide the following convenient mechanism. The outer extremity of the spring 48 is connected to a slide block 49, which is radially adjustable, so as to pull or let up on the spring. The block is guided in these movements by guide bars 50. The block has a diagonal slot produced at one side, and this slot is engaged by an inclined bar 51, which may be moved longitudinally so as to act as a cam for trusting the block from or toward the center of the eccentric. The cam bar 51 may be mounted by means of a pair of outstanding brackets 52 and 53, both secured to a slidable shaft 54, having at one point a collar 55, from which project opposite pins 56, engaged by the yoke 57 of an arm 58, mounted on a rock shaft 59, which may be swung at will by a pedal 60, so as to throw the slide shaft 54 and the cam bar longitudinally to secure the desired adjustment of the spring 48, and thereby of the speed ratio.

As shown in Fig. 1, the spring 48 and the slide block are in position for a speed ratio almost equal to unity. If the cam bar 51 be shifted to the right from the position shown, this will impose greater and greater tension on the spring 28, thereby progressively reducing the action of the spring 23, and thus reducing the driving ratio, until the point is reached where the spring 23 is nullified. Thereupon drive will cease. If the adjustment be continued beyond this point, the result will be that the eccentric 45 will be held against rotation. This will promptly bring to rest the sleeve 35, and cause the gear 36 to come to rest. With the gear 36 stationary, the rotation of the driving parts acting through the pinions 37 and 40, which act as planetary gears, will operate through the gear 18 to directly but slowly drive the driven shaft 17 in a reverse direction.

The movable elements carried by the driving member or flywheel, including the spring 23, constitute a yielding or pulsating connection between the driving and driven members of such nature and arrangement that, as the driving member rotates, the connections operate to produce torque alternately in opposite directions. When acting in one direction the driven parts are advanced, but owing to the pawl and ratchet means, which confines the driven shaft against rotation in the opposite direction, the opposite torque is thus caused to be thrown back upon the driving member. The action may be described as comprising two phases, during one of which the spring is put under increased tension, and during the other of which the spring relaxes. In the first phase the energy of the driving parts operating through the tensioned spring and the other connections acts to produce a torque which advances the driven member. During the other phase the driven member is held against opposite rotation as stated, so that the spring in contracting will apply the torque to advance the driving member, thus conserving the power, which is eventually transmitted to the driven parts at increased torque. The spring elements carried by the driving parts, thus acting as a resiliently yielding and reasserting device, might be replaced by analogous resilient devices having the described action and result, within the present invention. Thus, centrifugally operating weights might be substituted for the spring, and I have shown such an embodiment in a companion application, wherein the underlying principles of my basic invention and the advantages and mode of operation are described more fully than herein. In the present embodiment, as in said copending case, the first phase of action or that in which the resilient member receives power from the driving member and imparts power to the driven member, may be indefinitely prolonged, thus giving unity speed ratio. This occurs automatically when the torque required in the driven shaft is not greater, but equal to that delivered by the driving shaft. From this advantageous action it results that during normal road driving the mechanism is free from internal motion, and all the parts rotate as a unit. It is only when the driven parts require a greater torque that the play of the internal mechanism takes place and this results, as described, in a sort of temporary conserving of the driving energy, which is thrown fractionally into the driven members on alternate phases of action, and is thrown back through the resilient device into the flywheel or driving member in the other phases, with the net result that the driven parts, rotating at a reduced speed ratio, possess the desired superior torque to meet the upgrade or other practical conditions. The change of action of the mechanism in these respects is automatic, hence the operator is enabled to proceed solely by the throttle, and the transmission from the engine to the vehicle wheels controls itself, so that, as the load or resistance increases, the driven speed decreases, accompanied by an increase of driven torque. The reservoir spring is an important supplement to the mechanisms described, but it might be located at various points between the vehicle wheels and the intermediate part on which the described resilient connections directly act. The intermediate elements 26, 27, 32 and 45, which are rigidly connected, in reality constitute a driven part, which, however, is driven irregularly or intermittently, the reservoir spring rendering even and smooth the transmission to the true driven parts. The driving action on the vehicle wheels will be fairly uniform in view of the extent of yield in the reservoir spring and the frequency with which energy impulses are delivered into it. Indeed, when driving at unit ratio, the second phase of action is eliminated and power is continually delivered to the intermediate member and reservoir. At reduced ratios the action will be intermittent, but each power imparting action may continue over two or three or more complete revolutions, whereas the intervening periods will be exceedingly brief, a half revolution or less, during which the resilient element will be restoring to the driving parts the unused power or torque. The difference between the power received by the resilient element from the driving member and the power restored thereto will be the power used by the driven shaft.

The novel transmitting means of this application is a combination including the elastic device, exemplified by spring 23, and I do not herein make the underlying claims which would include either such elastic device or different devices, for example the centrifugally operated devices of my copending applications, Serial Numbers 364,897 filed March 11, 1920, and 531,591 filed January 25, 1922; such underlying combination being claimed in said copending applications, and this application being specifically limited to an elastic device as stated.

It will thus be seen that I have described a variable speed transmission embodying the principles of the present invention; and since many matters of combination, arrangement, design and detail may be variously modified without departing from the novel principles, it is not intended to limit the invention to such matters except in so far as set forth in the appended claims.

What is claimed is:

1. A variable speed transmission apparatus comprising in combination, a rotating driving member, an elastic device eccentrically secured to said driving member, a rotatable driven member, and a train of connections, between said elastic device and the driven member, including a one-way device controlling the same, whereby rotation is transmitted through said elastic device, in one direction only, to the driven member.

2. Apparatus as in claim 1 and wherein the elastic device acts eccentrically on both members.

3. Apparatus as in claim 1 and wherein the elastic device acts eccentrically on both members, so as to yield in one phase and reassert itself in the succeeding phase, as the members rotate at different speeds, the one way device preventing reverse rotation of the driven member.

4. Apparatus as in claim 1 and wherein the elastic device acts eccentrically on both members and is of sufficient strength that with small loads it will maintain the connections in position to drive at unit ratio.

5. A variable speed transmission apparatus comprising in combination, a rotating driving member, a movable guide or arm eccentrically mounted on the driving member, a rotatable driven member having an eccentric portion or crank, a connecting link between said guide and crank, a spring exerting elastic force on said guide, link and crank, and a one-way device preventing reverse rotation of the driven member.

6. Apparatus as in claim 1 and wherein means are provided to adjust the acting force of the elastic device.

7. Apparatus as in claim 5 and wherein means are provided to adjust the acting force of the spring.

8. A variable speed transmission apparatus comprising in combination, a rotating driving member, a rotatable driven member in alinement therewith, a spring device having eccentric connection to each of said members whereby it may exert stress upon both of them, and a one-way device preventing the driven member rotating except in one direction.

9. A variable speed transmission apparatus comprising in combination, a rotating driving member, a rotatable driven member, a spring connection between the members, connected to stress the driven member forward and the driving member reversely in one phase and vice versa in another phase, and a one-way device permitting only forward movement of the driven member.

10. Apparatus as in claim 9 and wherein the one-way device comprises one or more rollers adapted to wedge between the driven member and a relatively stationary member.

11. Apparatus as in claim 9 and wherewith is combined a second one-way device arranged to prevent the driven member advancing faster than the driving member.

12. A variable speed transmission apparatus comprising in combination, a rotating driving member, a rotatable driven member, a device between said members acting alternately to stress forwardly the driven member and then reversely, a one-way device to prevent reverse rotation of the driven member, and a one-way device to prevent the driven member exceeding in speed the driving member.

13. A variable speed transmission apparatus comprising in combination, a rotating driving member, a rotatable driven member, a spring connection between the members, connected to stress the driven member forward and the driving member reversely in one phase and vice versa in another phase, and an exterior non-rotatable means for offsetting or reducing the stress of such spring connection.

14. Apparatus as in claim 8 and wherein the spring device, eccentrically connected to the rotating members, is adjusted in stress by a second eccentric or arm at an accessible point combined with a non-rotatable spring adjustable in stress to more or less balance the said spring device.

15. A variable speed transmission apparatus comprising in combination, a rotating driving member, a resiliently yielding and reasserting device carried on said driving member, a rotatable driven member, a train of connections, between said resilient device and the driven member, including a one-way device controlling the same, whereby rotation is transmitted through said resilient device, in one direction only, to the driven member; said driving and driven members being in axial alinement, a gear on said driven member, a united pair of planetating gears of slightly different diameter mounted on the driving member, one of them engaging said driven member gear, a final driven shaft, and a gear thereon engaging the other planetating gear, whereby through control of said gears the final shaft may be reversed in direction.

In testimony whereof, I have affixed my signature hereto.

JOHN REECE.